7631X
D. Hinman.
Forging Axes.
Patented June 29. 1833.
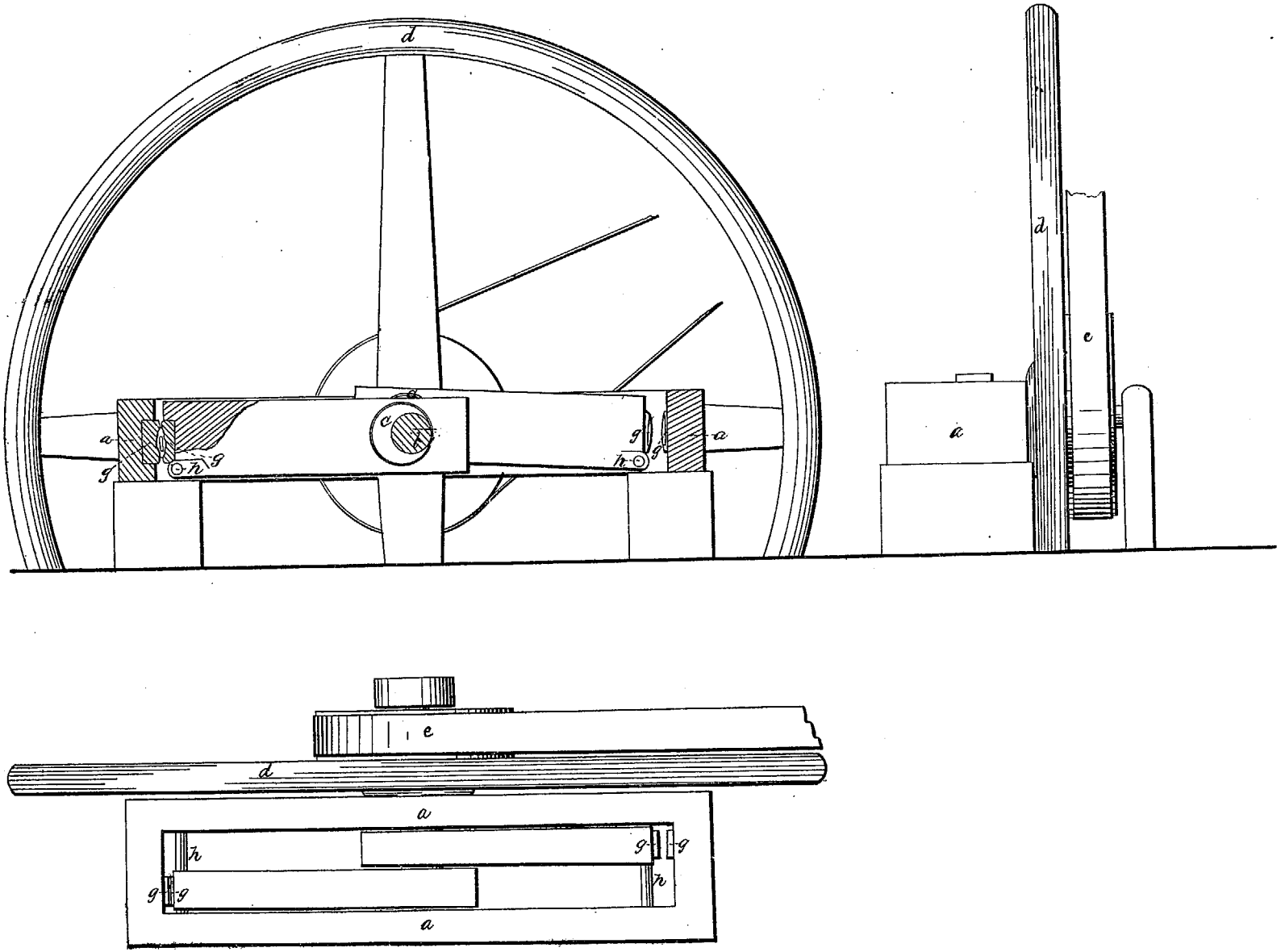

7631X June 29. 1833

David Hinman of Canton, Co. of Hartford, Connecticut.

The schedule referred to in these Letters Patent & making part of the same, containing a description in the words of the said David Hinman himself of his improvement In machinery for Forging Axes. ——

To all to whom these presents shall come.

Be it known that I David Hinman of Canton in the County of Hartford & State of Connecticut, have invented a new & useful Improvement in the Forging of all kinds of Axes, by driving or compressing the heated iron into dies or moulds of proper form by the application of mechanical pressure of a kind different or distinct from either rolling or hammering. ——

The said mechanical pressure may be given by many kinds of presses differently constructed, but having sufficient strength to accumulate & apply an intense pressure to the dies, in which the various parts of the work are to be formed. —— One of the dies being firmly fixed & stationary, & the other die either forced against or towards it in a direct line, or, what I consider better, it may have a kind of rolling motion given to it at the same time that it is approaching the stationary die. —— A double press of sufficient strength & power, & the most convenient one that I have constructed is of the following description & dimensions viz. An oblong frame of cast Iron is laid horizontally and raised one or two feet above the level of the floor, the clear space within this frame, is about seven feet by two feet, the solid substance of this frame is about six inches thick by one foot deep. Across this frame the narrowest way is a large cast or wrought Iron shaft ten inches diameter, on which are two cams or excentrics. so constructed as that both of the cams operate to move a slide between the sides of the frame — the excentricity of the cams being such as to move said slide from one to two inches endwise during each revolution of said shaft — This shaft has a fly wheel upon it about sixteen feet diameter & weighing about six thousand pounds, & motion is given to it by a large belt; in the end of the slide farthest from the shaft is a large mortise or socket into

7631X which any form of dies may be set, such as the several parts of the work to be done may require, the corresponding stationary dies, being set in a bed or socket in the outer end of the iron frame. — The same shaft & cams may work two presses one on each side, between the shaft and each end of the frame. In order to give a kind of rolling motion to the slide (& of course to the moving dies) it is not confined within rails or ribbons, but is sustained within the frame by a gudgeon passing thro' said slide horizontally, very near the end, where the dies are set into it, & as near as may be in a line with the face of the dies, which are made a little convex or cylindrical that so the face of the moving dies may have a partially rolling motion as they approach the stationary dies — the other end of the slide on which the cams operate, being moved by the cams partly endwise & partly in a diagonal direction, or moved thro' a segment of the circle which the cams describe. ——

What I claim as new, & as my own invention or improvement & for which I claim an exclusive privilege, is the application of a powerful press of the above or any of the more common constructions, operating on dies, moulds, or swedges, in a direct or nearly direct manner, to give to the heated iron & Steel the several forms which are successively requisite in forging it into all kinds of Axes. ——

Witnesses
Erastus Shaw
Isaac Kellogg

David Hinman (700 wds)

Patented 29th June 1832.